(12) United States Patent
Matsuura et al.

(10) Patent No.: US 7,208,224 B2
(45) Date of Patent: Apr. 24, 2007

(54) HIGHLY DESIGNABLE RESIN LAMINATE MAT

(75) Inventors: Akihiro Matsuura, Aichi (JP); Mary Dovell, Woodstock, OH (US); Masato Ishibashi, Dublin, OH (US)

(73) Assignees: Honda Giken Kogyo Kabushiki, Tokyo (JP); Hayashi Telempu Co., Ltd., Aichi (JP)

(*) Notice: Subject to any disclaimer, the term of this patent is extended or adjusted under 35 U.S.C. 154(b) by 0 days.

(21) Appl. No.: 10/305,289

(22) Filed: Nov. 27, 2002

(65) Prior Publication Data
US 2003/0124352 A1    Jul. 3, 2003

(30) Foreign Application Priority Data
Nov. 29, 2001   (JP)   ............... 2001-363924

(51) Int. Cl.
  B32B 5/16    (2006.01)
  B32B 27/20   (2006.01)
(52) U.S. Cl. ............ 428/328; 428/46; 428/47; 428/48; 428/337; 428/423.1; 428/451; 428/515; 428/516; 428/523
(58) Field of Classification Search ............ 428/46, 428/47, 48, 328, 515, 516, 337, 423.1, 523
See application file for complete search history.

(56) References Cited

U.S. PATENT DOCUMENTS 4,871,613 A * 10/1989 Akao .................. 428/328
5,192,609 A *  3/1993 Carroll, Jr. ............ 428/328
5,725,712 A *  3/1998 Spain et al. ............ 156/230

FOREIGN PATENT DOCUMENTS

| JP | 59-171496 | 3/1986 |
| JP | 59-279896 | 7/1986 |
| JP | 60-083700 | 10/1986 |
| JP | 60-159596 | 1/1987 |
| JP | 60-234520 | 5/1987 |
| JP | 60-236389 | 5/1987 |
| JP | 60-236390 | 5/1987 |

* cited by examiner

*Primary Examiner*—D. S. Nakarani
(74) *Attorney, Agent, or Firm*—Irving, Prass & Stelacone; Mark E. Duell

(57) ABSTRACT

Resin laminate mat is produced by laminating an outer layer comprising a transparent base resin and highly luminant particles dispersed in the transparent resin, and a back layer made of a colored resin. Back layer is composed of upper layer containing a coloring agent and lower layer containing a filler. Preferably, the transparent base resin of the outer layer is mainly composed of a linear low-density polyethylene resin, while the back layer is mainly composed of a mixture of a linear low-density polyethylene resin and a low-density polyethylene resin.

12 Claims, 2 Drawing Sheets

HIGHLY DESIGNABLE RESIN LAMINATE MAT

PRIORITY CLAIM

This application claims the benefits under 35 U.S.C. § 119 of Japanese Patent Application No. 2001-363924, the disclosure of which is hereby incorporated by reference.

FIELD OF THE INVENTION

The present invention relates to a resin molded mat, and more particularly, to a highly designable resin laminate mat which is suitably molded into a floor mat for a car and the like.

BACKGROUND OF THE INVENTION

Conventionally, moldings formed by vacuum-molding and/or press-molding resin sheets are used for a floor mat and a trunk mat in a car.

For forming this type of mat through vacuum molding, a thermoplastic resin sheet is first formed through extruding or calendering. Then, the thermoplastic resin sheet is heated for plasticization, and placed on a mold having a molding surface in a desired shape and into which a number of air vents are opened. Next, air is drawn out from the air vents to aspirate the plasticized thermoplastic resin sheet so that it is conformal with the molding surface. Subsequently, the thermoplastic resin sheet is cooled down to complete a mat having the desired shape.

On the other hand, for forming this type of mat through press molding, a thermoplastic resin sheet likewise formed through extruding or calendering is heated for plasticization, then placed between a pair of molds having a molding surface in a desired shape, and clamped. Subsequently, the thermoplastic resin sheet is cooled down, and removed from the molds to provide a mat having the desired shape.

For the thermoplastic resin used to produce such mats, a vinyl chloride resin is often used because of its high degree of freedom in molding. In addition, one surface of the thermoplastic resin sheet is generally patterned for improving the designability. The patterning may be applied to the thermoplastic resin sheet by passing the sheet through patterning rolls. Alternatively, a mold previously formed with a decorative pattern on its molding surface may be used to transfer the pattern to the surface of the resin sheet during a molding process to provide a patterned sheet.

The resin molded mat produced as described above is improved in the designability with a color tone and a decorative pattern on the resin sheet. Actually, however, resin molded mats are limited in available color tones (pigments) and decorative patterns, so that resultant moldings are limited in design. Due to such limitations, a need exists for techniques for creating more novel designs.

SUMMARY OF THE INVENTION

The present invention has been made in view of the above problem in the prior art, and it is an object of the invention to provide a resin molded mat having a heretofore unavailable unique design, particularly, a color tone, which can be formed through vacuum molding or press molding, particularly suitable for use in a car as a floor mat and a trunk mat, thereby improving the designability of interior parts for the car through such use.

To achieve the above object, the inventors diligently studied a method of forming a resin molded mat having a novel design, and found a method of blending highly luminant particles, made of a metal, such as aluminum particles into a resin which comprised a resin molded mat. However, the highly luminant particles directly blended into a colored resin will not significantly contribute to an increased designability of the resulting mat because the highly luminant particles can be seen only on the surface of the mat from the outside. To solve this drawback, the inventors dispersed the highly luminant particles into a transparent base resin to create an outer layer which was then laminated on a back layer made of a colored resin to form a resin laminate mat. The inventors found that the resulting resin molded mat can be shining, gave a sense of depth, and had a heretofore unavailable unique designability.

Namely, with the resin laminate mat according to the present invention thus formed, a portion of light rays incident from the surface transmits the transparent base resin of the outer layer to reach the back layer including a coloring agent, and is reflected on the surface of the back layer and exits therefrom. This light gives an appearance which reflects the color tone of the back layer to the resin laminate mat. Simultaneously, another portion of the incident light rays is incident on and diffusely reflected by the highly luminant particles dispersed in the outer layer. This light gives a shining appearance to the resin laminate mat.

In this event, since the outer layer comprises the transparent base resin, light incident on the resin laminate mat reaches the respective highly luminant particles and is diffusely reflected thereby. In other words, all the highly luminant particles can act to diffusely reflect the light. Thus, the highly luminant particles can efficiently produce an action of increasing the designability and further give a sense of depth to the appearance of the resin laminate mat.

In the present invention, the back layer is preferably composed of two layers. In this way, a coloring agent can be contained in an upper layer so that the upper layer can act to adjust a color tone, while a filler can be contained in a lower layer so that the lower layer can act to prevent the resin laminate mat from softening too much during a molding process to successfully carry out the molding process.

For giving a satisfactory designability as described above to the resin laminate mat, the base resin of the outer layer preferably has a light transmissivity of 10% or higher.

Preferably, the transparent base resin of the outer layer as well as the resin of the back layer are mainly composed of a linear low-density polyethylene resin. The use of the linear low-density polyethylene resin permits the successful molding and the formation of resin laminate mat which has a high flexibility, a high abrasion resistance, and a high resistance to tearing, and can also prevent adverse effects on the environment. The resin of the back layer may further be mixed with a low-density polyethylene resin.

The outer layer may be coated with a transparent urethane and/or silicone resin on the surface, thereby making it possible to prevent the outer layer from being scratched.

The resin laminate mat of the present invention can be molded into a predetermined three-dimensional shape through vacuum molding or press molding after preheating. The resin laminate mat, molded in this manner, can be suitably used particularly for a floor mat and a trunk mat for a car.

The above and other objects, features and advantages of the invention will become apparent from the following description with reference to the accompanying drawings which illustrate examples of the present invention.

DESCRIPTION OF THE PREFFERRED EMBODIMENT

In the following, a preferred embodiment of the present invention will be described with reference to the accompanying drawings.

Figure 1A:
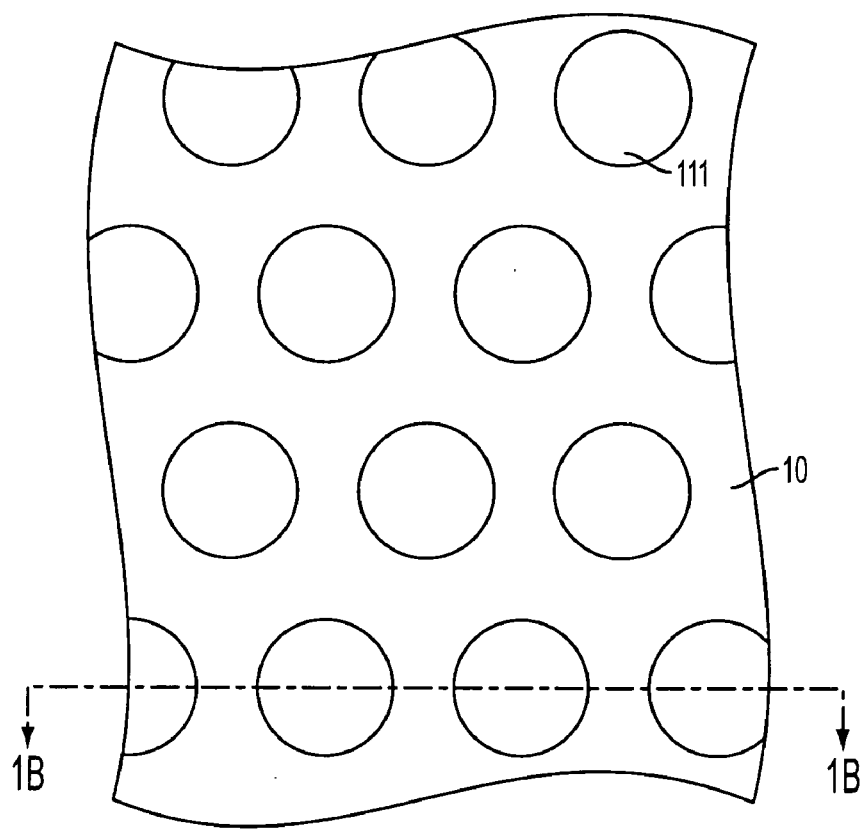
FIG. 1A is a plan view illustrating a resin laminate mat according to one embodiment of the present invention.
Figure 1B:
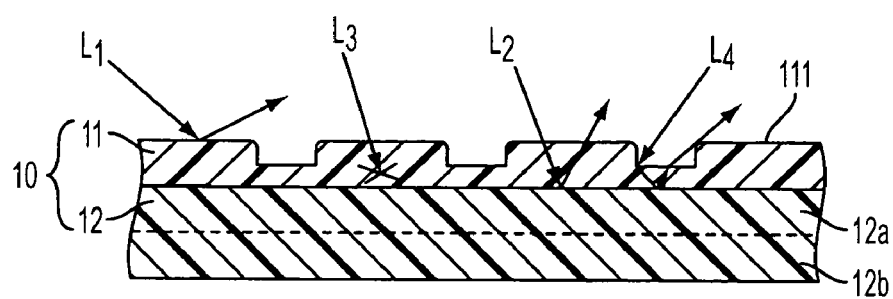
FIG. 1B is a cross-sectional view taken along a line A-A in FIG. 1A.

As illustrated in FIGS. 1A and 1B, resin laminate mat 10 according to this embodiment comprise outer layer 11 made up of a transparent base resin and highly luminant particles made of a metal or the like and dispersed in the transparent base resin; and back layer 12 made of a colored resin and laminated on the back face of outer layer 11. Outer layer 11 is formed with decorative pattern 111 on the surface thereof in a predetermined pattern of concave and convex. In a preferred example illustrated in FIGS. 1A and 1B, decorative pattern 111 is made up of circular salients, having a height of less than 3 mm from the surrounding surface, arranged in a staggered array.

Outer layer 11 and back layer 12 are respectively made of a resin sheet formed through sheet extruding or calendering. Outer layer 11 and back layer 12 may be laminated at the time they are formed. Alternatively, they may be heated for lamination of one on the other, after they have been formed.

Back layer 12 is composed of two layers: upper layer 12a and lower layer 12b. Upper layer 12a, which contains a coloring agent, acts to adjust a color tone. Lower layer 12b contains a filler.

As coloring agents, inorganic agents (having light resistance) may be used. For example, in order to color an upper layer gray, carbon black (C) and titanium oxide ($TiO_2$) may be used as black and white agents, respectively. The preferred manufacture of the coloring agent is TOKYO PRINTING INK CORPORATION. Alternatively, coloring agents manufactured by TOYO INK CORPORATION, DAINIPPON INK AND CHEMICALS INC., or other suitable manufacturers may be used.

The amount of coloring agent preferably ranges from about 0.2–1.5 wt % to base resin, more preferably from about 0.5–1.0 wt %. The coloring agents are preferably mixed using masterbatch methods, however, other mixing methods known to those of skill in the art may also be used.

Fillers are used in order improve dimensional stability. Talc ($Mg_3Si_4O_{10}(OH)_2$) is the preferred filler. Alternatively, calcium carbonate ($CaCO_3$) and other conventional fillers of natural ingredients known to those of skill in the art may be used. The filler is preferably mixed at about 0–20 wt % to base resin, more preferably at about 10 wt %.

Thus, resin laminate mat 10 formed by lamination of outer layer 11 and back layer 12 can be molded into a desired shape through vacuum molding or press molding after it is heated again for plasticization. In this event, lower layer 12b of back layer 12, which contains a filler as described above, can act to prevent overall resin laminate mat 10 from excessively softening, when resin laminate mat 10 is heated, to successfully carry out a molding process. The mat molded into a desired shape in this manner can be suitably used as a floor mat for a car and the like.

Next, the designability of resin laminate mat 10 will be described with reference to FIG. 1B. In FIG. 1B, $L_1$–$L_4$ schematically show a variety of light ray components incident on the surface of resin laminate mat 10, and paths of these components.

$L_1$ component represents a light ray component which is incident at an incident angle larger than a critical angle of surface reflection on outer layer 11. Light ray component $L_1$ is reflected on the surface of outer layer 11 without reaching the interior thereof. As the light ray thus reflected enters the observer's eyes, resin laminate mat 10, viewed by the observer, appears to have a glittering surface.

Next, $L_2$, $L_3$ components represent light ray components which are incident at incidence angles smaller than the critical angle of surface reflection on outer layer 11. $L_2$ component of the two reaches the surface of back layer 12 through outer layer 11, is reflected thereon, and exits from the surface of resin laminate mat 10. When the light ray thus exiting enters the observer's eyes, the observer sees a color which reflects a color tone of (upper layer 12a of) back layer 12.

On the other hand, $L_3$ component is diffusely reflected by the highly luminant particles halfway before it reaches back layer 12 after it has entered outer layer 11. A portion of diffusely reflected light exits from the surface of resin laminate mat 10. The entrance of the exiting light to the observer's eyes increases observed luminance of resin laminate mat 10 and gives a shining appearance. In this event, by dispersing the highly luminant particles of sufficiently small size, light components $L_2$, $L_3$, as viewed by the observer, appear to overlap each other, so that it seems to the observer that overall resin laminate mat 10 reflects the color tone of back layer 11 and simultaneously has a shining appearance. Further, since the highly luminant particles are dispersed within the transparent base resin, all the highly luminant particles can act to diffusely reflect light because the light is incident on each highly luminant particle, thereby effectively producing an action of making the surface shining. In addition, as light ray components $L_1$–$L_3$ enter the observer's eyes, overlapping one another, resin laminate mat 10 can apparently give the observer a sense of depth.

$L_4$ component represents a light ray component which is incident near a region on the surface of resin laminate mat 10 in which a step is formed for decorative pattern 111. This light ray component $L_4$ is refracted in complexity and emitted from resin laminate mat 10 after following a complicated path due to decorative pattern 111. As such light ray component $L_4$ enters the observer's eyes together with light ray components $L_1$–$L_3$, resin laminate mat 10 appears to have a unique changeful appearance. In addition, decorative pattern 111 thus provided can prevent light incident on resin laminate mat 10 from being totally reflected, thereby avoiding a monotonous design of resin laminate mat 10.

As described above, resin laminate mat 10 according to this embodiment can have a shining, changeful and novel design which has never been achieved before, because resin laminate mat 10 causes various reflection, diffuse reflection, and refraction of light rays incident thereon which exit from resin laminate mat 10 and enter the observer's eyes, overlapping one another. Resin laminate mat 10 gives a different degree of reflection and a different tone of light depending on an angle at which the observer views resin laminate mat 10. Receiving solar radiation or illumination, resin laminate mat 10 can appear to have a silver look or a gun metal look, brighter than a mat conventionally used as a floor mat for a car. Consequently, since resin laminate mat 10 according to this embodiment has such a novel designability and can be molded into any shape, it can be suitably used particularly for a floor mat and a trunk mat in a car.

In this embodiment, the thickness of resin laminate mat 10 may be chosen such that outer layer 11 has a thickness of 0.2 to 0.6 mm, and back layer 12 (upper layer 12a and lower layer 12b) has a thickness of 0.6 to 3.0 mm. As described above, back layer 12 is preferably composed of two layers since upper layer 12a mainly acts to adjust the color tone, while lower layer 12b prevents resin laminate mat 10 from softening during the molding process so that resin laminate mat 10 can be molded into a desired shape. However, back layer 12 may be composed of a single layer.

An olefin resin having a low degree of crystallinity is preferably used for the base resin of outer layer 11. Particularly, a linear low-density polyethylene is optimally used. A low-density polyethylene resin or a linear low-density polyethylene resin is preferably used for the base resin of back layer 12. Further, ethylene-based copolymer such as ethylene propylene rubber, ethylene vinyl acetate copolymer resin, or the like is preferably added to the base resins of outer layer 11 and back layer 12 to make them more flexible.

The low-density polyethylene resin used in this way can help resin laminate mat 10 maintain a relatively high tension even if resin laminate mat 10 is preheated for plasticization when resin laminate mat 10 is molded into a desired three-dimensional shape through vacuum molding or press molding. For this reason, resin laminate mat 10 can be successfully molded, without drooping, into even a large-sized mat, and a mat which partially has a significantly reduced width. Further, the use of a linear low-density polyethylene resin permits formation of resin laminate mat 10 which has a high flexibility, a high abrasion resistance, and a high resistance to tearing. Also, an olefin resin contained as a main component can reduce the possibility of causing adverse effects on the environment, as would be experienced when a vinyl chloride resin is used.

For giving a satisfactory designability to resin laminate mat 10, the base resin of outer layer 11 preferably has a light transmissivity of 10% or higher, and more preferably 30% or higher.

While metal particles such as aluminum powder is preferably used as the highly luminant particles dispersed in the base resin of outer layer 11, mineral particles made of mica, gold, silver or the like may be used instead. The highly luminant particles preferably have the color such as silver gray that produce a highly luminant appearance. The highly luminant particles of small size are preferably used because light rays diffusely reflected by the highly luminant particles can overlap with other light rays without sense of incompatibility to produce a preferred shining appearance. In particular, the highly luminant particles preferably have a size in a range of 5 to 180 μm. The highly luminant particles are preferably blended into the base resin in a proportion of approximately 0.1 to 0.3% in weight percent, and in a proportion of approximately 0.1 to 0.25% when aluminum powder is used as the highly luminant particles.

Decorative pattern 111 is not limited to that illustrated in the figures, but may have the salients in a different shape. Alternatively, decorative pattern 111 may comprise an array of recesses in a desired shape. As described above, in order to have decorative pattern 111 act to refract light in complexity to cause a change in the appearance of resin laminate mat 10 and improve the designability, the salients or recesses, which form decorative pattern 111, preferably have the height or depth on the order of several millimeters. This depth or height corresponds to 1 to 50% of the thickness of the resin laminate mat 10. The inventors found as a result of various trials that decorative pattern 111 thus formed could most effectively refract light in complexity.

Back layer 12 can be made in any of various colors to form many design variations together with adjustments of the shape, size and blending proportion of the highly luminant particles blended into outer layer 11. Outer layer 11 may be coated, as required, with a transparent urethane and/or silicone resin on the surface, thereby protecting outer layer 11 from scratches and polishing up the surface. The topcoat layer thus formed may be 6 μm (primer 3 μm+topcoat 3 μm) in thickness, for example.

EXAMPLES

Next shown is an example of the resin laminate mat according to the present invention which is formed as a floor mat for a car.

First, a sheet made of the aforementioned linear low-density polyethylene resin, serving as the outer layer, blended with aluminum powder (40 μm) serving as the highly luminant particles, was molded through T-die extruding to form a sheet 0.4 mm thick. The resulting sheet was applied with corona discharge processing, primer processing, and the like on the surface thereof to improve the adhesivity, and then coated with urethane and silicone.

Next, a calendering machine calendered a sheet, serving as the back layer, to form a sheet 1.6 mm thick (upper layer 0.4 mm+lower layer 1.2 mm). In this event, a coloring agent, talc, carbon black, and the like were added to a sheet made of a linear low-density polyethylene resin, which would form the back layer, to adjust the color tone and modify physical properties so that the sheet was compatible with vacuum molding in a subsequent process. The back layer (upper layer) was colored dark gray to satisfy total design needs.

Next, the resulting sheets, which would be the outer layer and back layer, were laminated through heat lamination to form a resin laminate mat 2.0 mm thick. Finally, this resin laminate mat was heated to 180–220° C., then placed on a vacuum mold having a predetermined molding surface, and molded into a desired shape conformal to the molding surface through evacuation. The vacuum mold used in this event had a decorative pattern formed on the molding surface to shape the resin laminate mat into a floor mat for a car and simultaneously to form the decorative pattern on the surface of the resin laminate mat. The decorative pattern was chosen to have oval figures of 0.7 mm height arranged in a staggered array.

Figure 2:
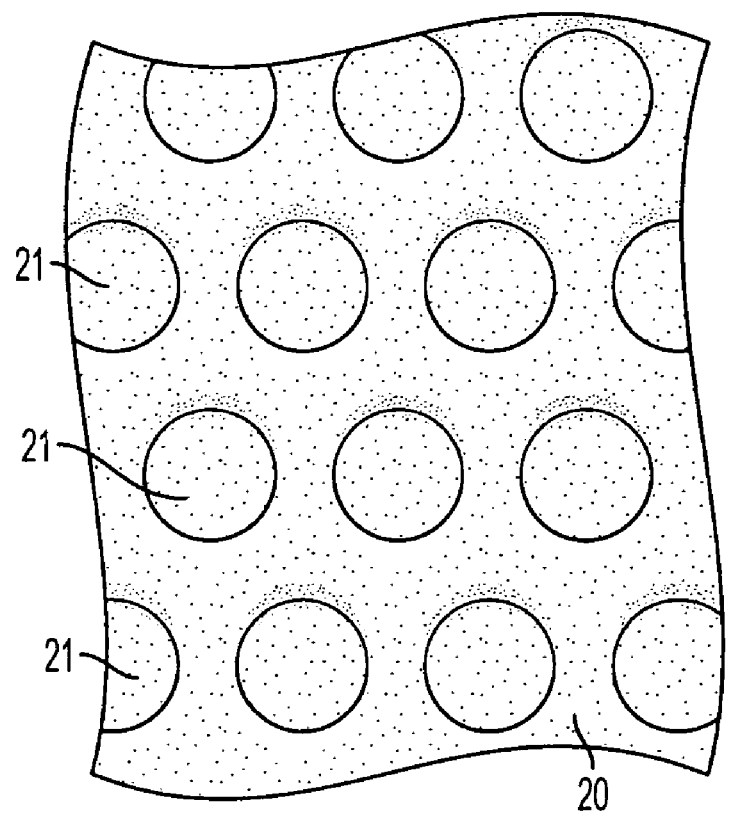
FIG. 2 is an outer view of an exemplary resin laminate mat which is formed in accordance with the present invention.

FIG. 2 shows an appearance of a portion of resin laminate mat 20 produced in the foregoing manner. Resin laminate mat 20 can have a bright appearance in a gun metal look as a whole and a changeful design because of different degrees of light reflection depending on locations, resulting from the molded shape. Particularly, the luminance is largely increased around peripheral edges of oval FIG. 21, giving a unique design to resin laminate mat 20.

The finished resin laminate mat had sufficient abrasion resistance so that it passed the Taber's abrasion test on condition using H-38 type abrasion ring, load 18N, 1500 rotations, and had sufficient Light Resistance so that neither discoloring nor degradation was occurred in light resistance test with UV carbon arc lamp on condition black panel 83° C., 300 hours, and light resistance test with UV Xenon lamp 75MJ.

While preferred embodiments of the present invention have been described using specific terms, such description is for illustrative purposes only, and it is to be understood that changes and variations may be made without departing from the spirit or scope of the following claims.

What is claimed is:

1. A resin laminate mat, comprising:
an outer layer comprising a base resin and luminant particles dispersed in the base resin; and
a back layer comprising a colored resin, wherein the back layer is laminated on a back face of the outer layer,
wherein the outer layer is formed into a pattern of salient features having heights ranging from 1% to 50% of the total thickness of the resin laminate mat,
the base resin and the colored resin are thermoplastic resins, and
the base resin allows light to pass through.

2. The resin laminate mat according to claim 1, wherein:
the back layer comprises an upper layer, adjacent to the outer layer, containing a coloring agent and a lower layer containing a filler, and
wherein the lower layer is a thermoplastic resin.

3. The resin laminate mat according to claim 1, wherein: the base resin of the outer layer has a light transmissivity of 10% or higher at a thickness of 0.2 to 0.6 mm.

4. The resin laminate mat according to claim 1, wherein: an outer surface of the outer layer is coated with at least one of a transparent urethane or silicone resin.

5. The resin laminate mat according to claim 1, wherein: the resin laminate mat is molded into a predetermined three-dimensional shape through vacuum molding or press molding after preheating.

6. The resin laminate mat according to claim 1, wherein said base resin of said outer layer comprises a linear low-density polyethylene resin.

7. The resin laminate mat according to claim 1, wherein said resin of said back layer comprises a linear low-density polyethylene resin.

8. The resin laminate mat according to claim 1, wherein said resin of said back layer comprises a low-density polyethylene resin.

9. The resin laminate mat according to claim 1, wherein the back layer has a thickness of between 0.6 mm to 3.0 mm.

10. The resin laminate mat according to claim 1, wherein the luminant particles comprise at least one particle selected from the group consisting of aluminum, mica, gold and silver.

11. The resin laminate mat according to claim 1, wherein the luminant particles comprise particles having a size ranging from 5 to 180 microns.

12. The resin laminate mat according to claim 1, wherein the base resin of the outer layer has a light transmissivity of 30% or higher at a thickness of 0.2 to 0.6 mm.

* * * * *